L. P. HALLADAY.
SUPPORT FOR AUTOMOBILE BUMPERS.
APPLICATION FILED JAN. 19, 1920.

1,344,798.

Patented June 29, 1920.

Witness
Edward T. Wray

Inventor
Lewis P. Halladay
by Parker & Carter
Attorneys

L. P. HALLADAY.
SUPPORT FOR AUTOMOBILE BUMPERS.
APPLICATION FILED JAN. 19, 1920.

1,344,798.

Patented June 29, 1920.
3 SHEETS—SHEET 2.

Witness
Edward T. Wray.

Inventor
Lewis P. Halladay,
by Parker & Carter
Attorneys

L. P. HALLADAY.
SUPPORT FOR AUTOMOBILE BUMPERS.
APPLICATION FILED JAN. 19, 1920.
1,344,798.
Patented June 29, 1920.
3 SHEETS—SHEET 3.
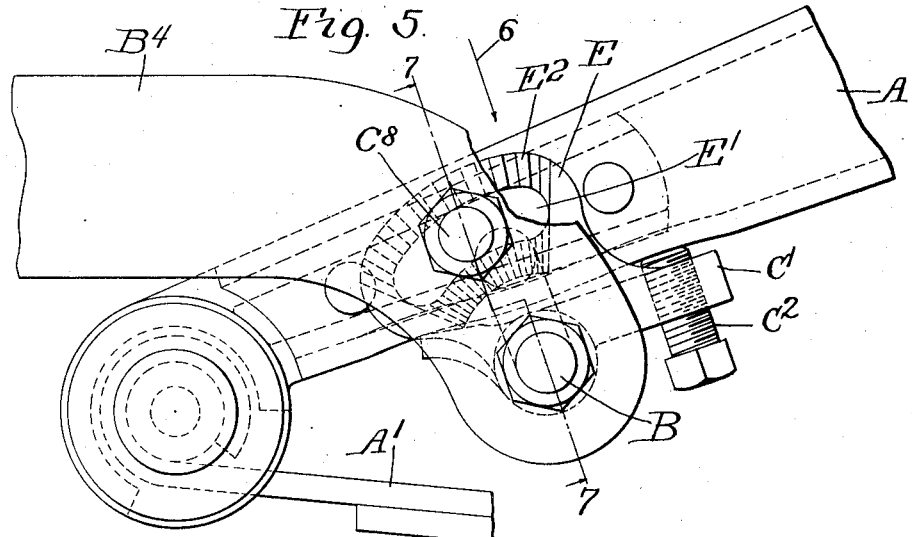
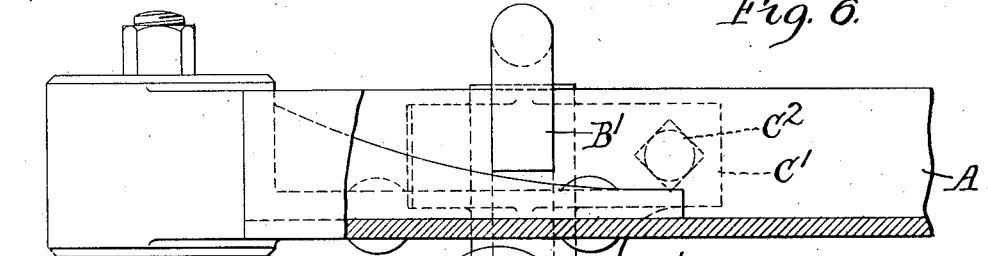
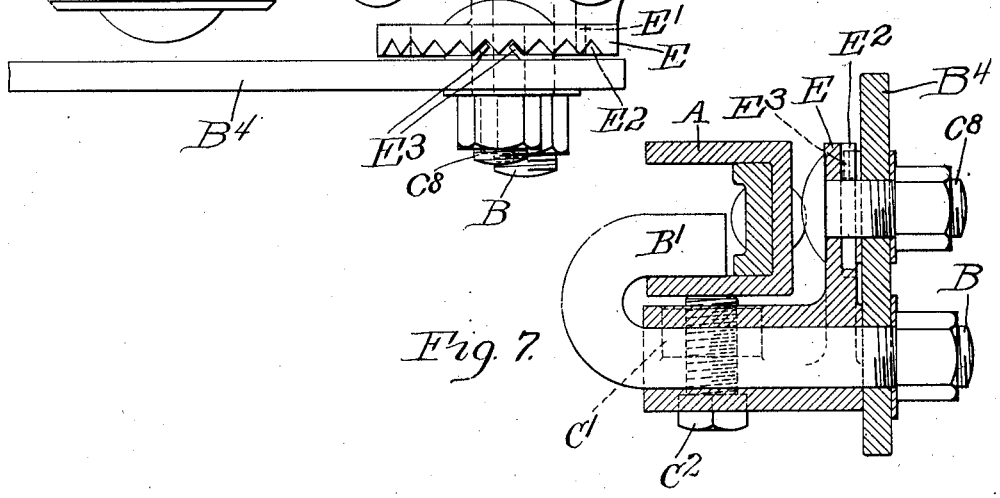
Witness
Edward T. Wray.
Inventor
Lewis P. Halladay
by Parker & Carter
Attorneys

UNITED STATES PATENT OFFICE.

LEWIS P. HALLADAY, OF STREATOR, ILLINOIS.

SUPPORT FOR AUTOMOBILE-BUMPERS.

1,344,798.  Specification of Letters Patent.  Patented June 29, 1920.

Application filed January 19, 1920. Serial No. 352,408.

*To all whom it may concern:*

Be it known that I, LEWIS P. HALLADAY, a citizen of the United States, residing at Streator, in the county of La Salle and State of Illinois, have invented a certain new and useful Improvement in Supports for Automobile-Bumpers, of which the following is a specification.

My invention relates to improvements for supports or clamps for automobile bumpers and is particularly adapted for use on cars having snubbers and the like attached to the frame near the forward end thereof.

In many forms of automobiles, there is ample room immediately adjacent the front end of the frame for the application of a plurality of holding hooks or clamps, for the attachment of the automobile bumper, but there are other automobiles wherein attachments such as snubbers or shock absorbers are attached to the frame, and on these there is not room enough for two bumper holding clamps spaced along the frame. That makes it necessary to provide a single clamp which will hold the bumper in position and this can easily be done if you can engage the frame on both sides but when the problem is complicated by the presence of a splash apron extending across between the upper sides of the frame horn and it becomes necessary to fasten the bumper to the lower frame flange only, it is necessary then to provide some special type of hook or clamp which will engage the frame at one point only and which will hold the bumper by its own unaided force. My invention has for one object to provide such an arrangement.

Another object of my invention is to provide a single bumper holding clamp which will have two attachments or points of attachment with the bumper so that the bumper may be at the same time pivoted on the clamp and adjusted about such pivot. Other objects of my invention will appear from time to time in the specification.

My invention is illustrated more or less diagrammatically in the accompanying drawings wherein:

Fig. 5 is a side elevation of a modified form;

Fig. 6 is a plan view, looking in the direction of the arrow 6 in Fig. 5 with a portion of the frame in section;

Fig. 7 is a section along the line 7—7 of Fig. 5.

Like parts are illustrated by like characters throughout the drawings.

Figure 1:
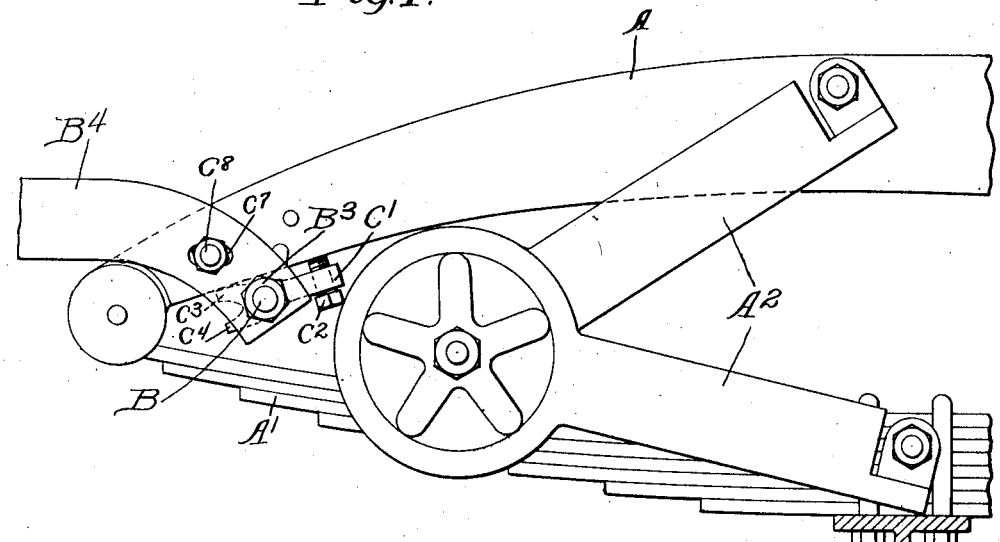
Figure 1 is a side elevation of one of the front frame horns of an automobile showing my device in place.

A is the front end of an automobile frame having the usual spring $A^1$ and carrying a snubber $A^2$ which is so near the front end of the frame that little room is left for the bumper attachment.

B is a U shaped hook bolt, the U or hook portion $B^1$ engaging the inner edge of the lower flange of frame throughout substantially its entire length. This bolt is screw threaded at $B^2$ and carries a nut $B^3$ whereby the bumper support $B^4$ may be pivotally attached and drawn rigidly into position in the usual manner.

C is a sleeve mounted for rotation on the bolt B. Projecting outwardly from it in one direction is an arm $C^1$ underlying the frame member. $C^2$ is a set screw, screw threaded in the lever $C^1$ adapted to engage the under side of the frame flange. $C^3$ is a fulcrum arm or cam member extending outwardly from the opposed side of the lever and adapted to engage the under side of the frame flange so that when the set screw is tightened up on the flange, the sleeve is rotated on the U bolt, and the U bolt, sleeve, fulcrum lever, and set screw are all clamped rigidly on the frame, the clamping action being entirely in a direction normal to the flange. $C^4$ is a similar fulcrum lever spaced from the lever $C^3$ so that the sleeve may be reversible and the same kind of sleeve may be used on both sides of the automobile, there being one for each frame member. $C^5$ is an arm extending outwardly from the sleeve at a point outside of the frame member. It is slotted as at $C^6$ in opposition to a slot $C^7$ which is substantially normal thereto in the bumper support $B^4$. The bolt $C^8$ passes through the two slots and may be tightened up to lock the parts in proper angular position, the idea being that by means of the two intersecting slots, what is in effect in part at least, a self locking arrangement is effected, or at least there is a tendency on the part of these two inclined or intersecting slots, when in opposition to the bolt, to resist rotary movement of the bumper bar support about the pivot point on the U bolt.

D—D are arms projecting upwardly from the sleeve and adapted to engage the outer wall of the frame. When these arms are used, tightening up of the nut on the U bolt brings these arms snugly up against the sides of the frame and prevents any rotary movement of the U bolt and its associated parts about the frame in a generally horizontal plane, though it may be said here that the grip obtained by the clamping action of the set screw of the U bolt and the fulcrum levers is so great that the frame may be actually destroyed without releasing the hold whether these arms are there or not. If these arms are not in position or are not used, then tightening up of the U bolt will tend to seat the edge or end of the sleeve in the hook formed by the U bolt, but in any event, after the parts are tightened up relative movement of any of the parts is quite impossible because the clamping action is quite sufficiently powerful to bend the frame flange itself into a wavy or wavelike contour.

Figure 4:
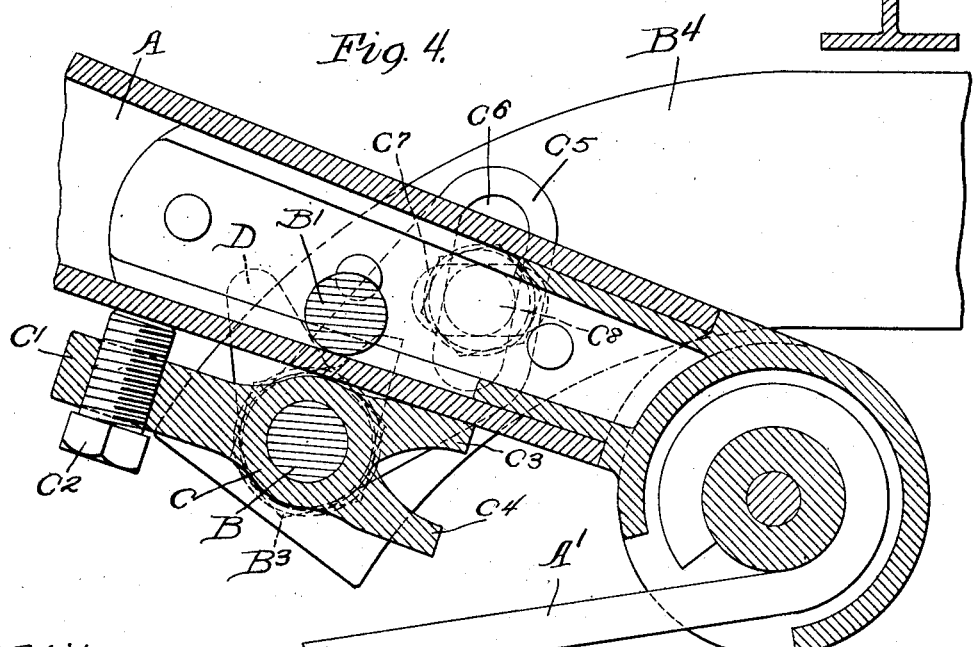
Fig. 4 is a section along the line 4—4 of Fig. 3.
Figure 2:
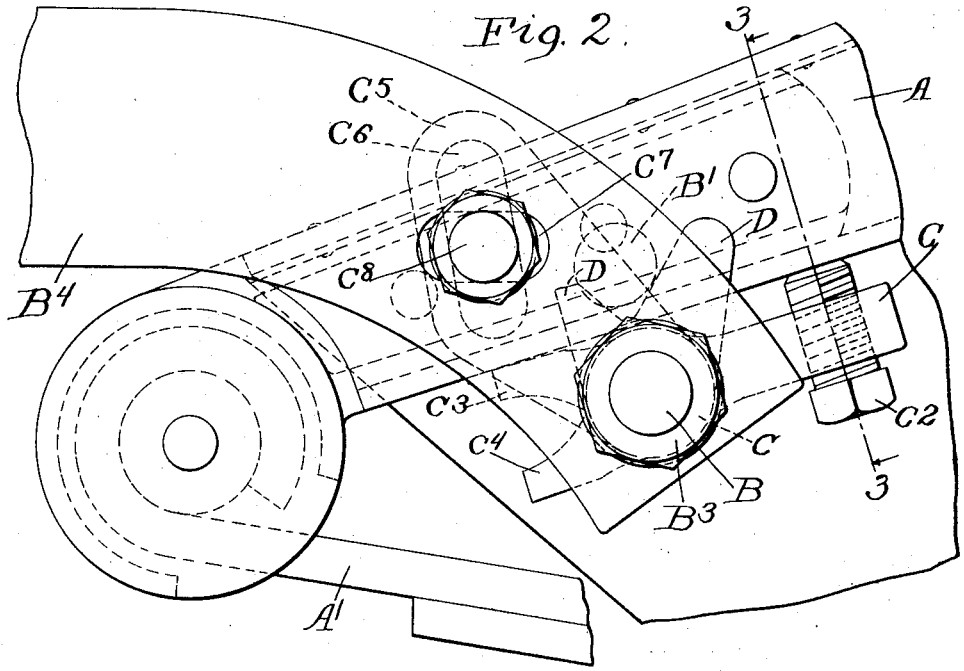
Fig. 2 is a detail side elevation similar to Fig. 1, on a larger scale.
Figure 3:
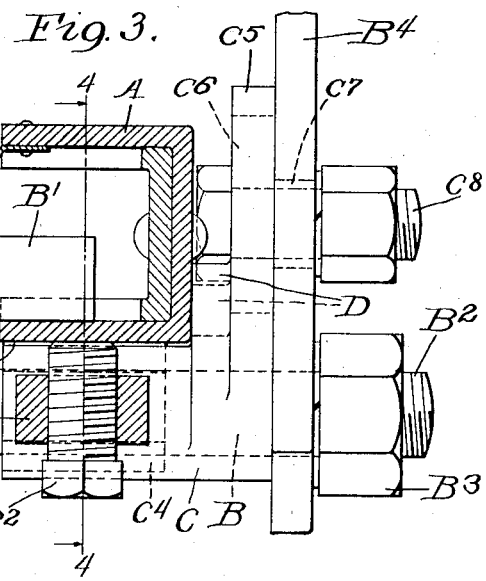
Fig. 3 is a section along the line 3—3 of Fig. 2.

The modified form which perhaps may in many cases be the preferred form illustrated in Figs. 5, 6, and 7 is, so far as its clamping action is concerned, identical with the device shown in Figs. 1 to 4 inclusive. The bumper bar is pivoted on the bolt B in exactly the same manner but the difference lies in the adjusting lug E which has at its outer extremity, a circular slot $E^1$ concentric with the body of the hook B. The surface of this arm is serrated as at $E^2$ and these serrations are adapted to be engaged by the outwardly turned ends $E^3$ of a washer threaded on the holding bolt $C^8$. The difficulty here, is that this holding bolt passes through a single hole in the bumper supporting member $B^4$ so that the only adjustment takes place when this member is rotated about the shaft B, the holding bolt traveling along a circular path through the slot $E^1$. Obviously when this bolt is tightened up and the lock washer is brought into engagement with the serrations, the bumper bar is held against rotation with respect to the clamp, thus the matter of adjustment is a very simple one and the adjustment once made, is a permanent one, though it can easily be changed by a mere release in the tension on the holding screw.

It will be evident that while I have shown in my drawings an operative device, still many changes might be made in size, shape, and arrangement of parts without departing materially from the spirit of my invention, and I wish therefore, that my drawings be regarded as in a sense, diagrammatic.

The use and operation of my invention are as follows:

The operator places one of the clamp assemblies including the sleeve and hook or U bolt in position on the frame near its forward end and tightens up the set screw slightly. He then places the bumper bar supports on the ends of the U bolt and tightens the nuts on them up slightly. He then puts a short bolt through the two intersecting slots, adjusts the bumper bar until the proper height from the ground is reached and tightens up the short bolt through the intersecting slots. He then tightens up both set screw and the nut, driving them both home so that the parts are all locked in proper position. After this is done, the clamp will be seated so firmly on the frame that there is no possible chance of any displacement, in fact, the grip is so strong that the frame itself, will give or break before the clamping hold lets go.

Two different means for adjusting the position of the bumper bar with respect to the clamp, are shown. In both cases, the bumper bar support rotates about a pivot on the clamp. In one case the holding bolt passes through two intersecting slots so that a certain degree of adjustment is provided and the intersection of these two slots thus exerting pressure on the holding bolts in different lines, tends to lock the parts together. In the preferred form, however, only a single slot is used and that is in the arm of the clamp, that slot being concentric with the center of rotation of the bumper bar. The serrations in the surface surrounding this slot in coöperation with the locking washer on the holding bolt having members adapted to engage the serrations is quite sufficient when the holding bolt is tightened up to hold the parts in proper adjusted position.

I claim—

1. A clamp for automobile bumpers and the like comprising a clamping member adapted to engage one side of the frame, a lever, a connection between it and the clamping member, and means for rocking it to grip the flange between it and the clamping member, a bumper bar support pivoted on the clamping member and means associated with the lever for holding the bumper bar support against rotation about the clamping member.

2. A clamp for automobile bumpers and the like comprising a clamping member adapted to engage one side of the frame, a cam, a connection between it and the clamping member, and means for rocking it to grip the frame between it and the clamping member, a bumper bar support pivoted on the clamping member and means associated with the cam for holding the bumper bar support against rotation about the clamping member.

3. A clamp for automobile bumpers and the like comprising a clamping member adapted to engage one side of the frame, a lever, a connection between it and the clamping member, and means for rocking it to grip the flange between it and the clamping member, the rocking means comprising a set screw adapted to engage the frame, a bumper bar support pivoted on the clamping member and means associated with the lever for holding the bumper bar support against rotation about the clamping member.

4. A clamp for automobile bumpers and the like comprising a clamping member adapted to engage one side of the frame, a cam, a connection between it and the clamping member, and means for rocking it to grip the frame between it and the clamping member, the rocking means comprising a set screw adapted to engage the frame, a bumper bar support pivoted on the clamping member and means associated with the cam for holding the bumper bar support against rotation about the clamping member.

5. A clamp for automobile bumpers and the like comprising a clamping member adapted to engage one side of the frame, a lever, a connection between it and the clamping member, and means for rocking it to grip the flange between it and the clamping member, the lever being provided with an elongated sharpened frame engaging edge adjacent its fulcrum, the lever rocking means being farther removed from the fulcrum than the frame engaging edge, a bumper bar support pivoted on the clamping member and means associated with the lever for holding the bumper bar support against rotation about the clamping member.

6. A clamp for automobile bumpers and the like comprising a clamping member adapted to engage one side of the frame, a lever, a connection between it and the clamping member, and means for rocking it to grip the flange between it and the clamping member, the rocking means comprising a set screw adapted to engage the frame, the lever being provided with an elongated sharpened frame engaging edge adjacent its fulcrum, the lever rocking means being farther removed from the fulcrum than the frame engaging edge, a bumper bar support pivoted on the clamping member and means associated with the lever for holding the bumper bar support against rotation about the clamping member.

7. In an automobile bumper, a clamp adapted to be attached to the automobile frame, a flange thereon having a slot therein, a bumper supporting bar in engagement with the flange and a bolt passing through the bar and the slot to hold them together, the bumper supporting bar being independently pivoted on the clamp, the bolt being adapted to hold the bar against rotation about its pivot support.

8. In an automobile bumper, a clamp adapted to be attached to the automobile frame, a flange thereon having a slot therein, a bumper supporting bar in engagement with the flange and a bolt passing through the bar and the slot to hold them together, the bumper supporting bar being independently pivoted on the clamp, the bolt being adapted to hold the bar against rotation about its pivot support, the bumper bar having a slot intersecting the slot on the flange.

9. An automobile bumper support comprising a clamp, a bumper bar pivoted thereon, and means carried by the clamp independent of the pivot support for holding the bumper bar against rotation.

10. An automobile bumper support comprising a clamp adapted to engage the lower flange of an automobile frame, a bumper bar pivoted thereon, and means carried by the clamp independent of the pivot support for holding the bumper bar against rotation.

11. An automobile bumper support comprising a clamp, a bumper bar pivoted thereon, and means carried by the clamp independent of the pivot support for holding the bumper bar against rotation, said means comprising intersecting slots in clamp and bumper bar, and a locking bolt passing through both of them.

12. An automobile bumper support comprising a clamp adapted to engage the lower flange of an automobile frame, a bumper bar pivoted thereon, and means carried by the clamp independent of the pivot support for holding the bumper bar against rotation, said means comprising intersecting slots in clamp and bumper bar, and a locking bolt passing through both of them.

13. An automobile bumper support comprising a clamp, a bumper bar pivoted thereon, and means carried by the clamp independent of the pivot support for holding the bumper bar against rotation, means carried by the clamping member altogether independent of the clamping action, adapted to engage the outside of the automobile frame to prevent twisting of the clamp on the frame after it is in its holding position.

14. An automobile bumper support comprising a clamp adapted to engage the lower flange of an automobile frame, a bumper bar pivoted thereon, and means carried by the clamp independent of the pivot support for holding the bumper bar against rotation, means carried by the clamping member altogether independent of the clamping action, adapted to engage the outside of the automobile frame to prevent twisting of the clamp on the frame after it is in its holding position.

15. An automobile bumper support comprising a clamp, a bumper bar pivoted thereon, and means carried by the clamp independent of the pivot support for holding the bumper bar against rotation, said means comprising intersecting slots in clamp and bumper bar, and a locking bolt passing through both of them, means carried by the clamping member altogether independent of the clamping action, adapted to engage the outside of the automobile frame to prevent twisting of the clamp on the frame after it is in its holding position.

16. An automobile bumper support comprising a clamp adapted to engage the lower flange of an automobile frame, a bumper bar pivoted thereon, and means carried by the clamp independent of the pivot support for holding the bumper bar against rotation, said means comprising intersecting slots in clamp and bumper bar, and a locking bolt passing through both of them.

17. An automobile bumper bar support comprising a hook bolt engaging the flange of the automobile frame, a sleeve mounted for rotation on the hook bolt, a pair of opposed fulcrum arms projecting from said sleeve above and below the lever arm projecting therefrom on the side opposite the fulcrum arms, a set screw screw-threaded in said lever arm adapted to engage the frame to rotate the sleeve to clamp the parts upon the frame, the sleeve part being interchangeable between the opposed automobile frame members.

18. An automobile bumper bar support comprising a hook bolt engaging the flange of the automobile frame, a sleeve mounted for rotation on the hook bolt, a pair of opposed fulcrum arms projecting from said sleeve above and below the lever arm projecting therefrom on the side opposite the fulcrum arms, a set screw screw-threaded in said lever arm adapted to engage the frame to rotate the sleeve to clamp the parts upon the frame, the sleeve part being interchangeable between the opposed automobile frame members, a slotted arm projecting from the sleeve and frame, engaging arms projecting from the sleeve altogether independent of the clamping action and adapted to prevent twisting of the clamp on the frame.

19. An automobile bumper bar support comprising a hook bolt engaging the flange of the automobile frame, a sleeve mounted for rotation on the hook bolt, a pair of opposed fulcrum arms projecting from said sleeve above and below the lever arm projecting therefrom on the side opposite the fulcrum arms, a set screw screw-threaded in said lever arm adapted to engage the frame to rotate the sleeve to clamp the parts upon the frame, the sleeve part being interchangeable between the opposed automobile frame members, a bumper bar pivoted on the hook bolt, and means including a slot in the bar and the slot on the sleeve for holding the bumper bar against rotation on the clamp.

20. An automobile bumper bar support comprising a hook bolt engaging the flange of the automobile frame, a sleeve mounted for rotation on the hook bolt, a pair of opposed fulcrum arms projecting from said sleeve above and below the lever arm projecting therefrom on the side opposite the fulcrum arms, a set screw screw-threaded in said lever arm adapted to engage the frame to rotate the sleeve to clamp the parts upon the frame, the sleeve part being interchangeable between the opposed automobile frame members, a slotted arm projecting from the sleeve and frame, engaging arms projecting from the sleeve altogether independent of the clamping action and adapted to prevent twisting of the clamp on the frame, a bumper bar pivoted on the hook bolt, and means including a slot in the bar and the slot on the sleeve for holding the bumper bar against rotation on the clamp.

21. An automobile bumper clamp comprising a hook bolt one arm of which is adapted to engage one flange of an automobile frame, a lever pivoted on the other arm thereof, means for rotating it to clamp the frame between it and the hook, an adjusting lever integral therewith having an adjusting slot concentric with the hook bolt, a bumper bar pivoted on the bolt and means interposed between the bar and adjusting lever for locking the bar in adjusted position.

22. An automobile bumper clamp comprising a U shaped hook bolt one arm of which is adapted to engage one flange of an automobile frame, a lever pivoted on the other arm thereof, means for rotating it to clamp the frame between it and the hook, an adjusting lever integral therewith having an adjusting slot concentric with the hook bolt, a bumper bar pivoted on the bolt and means interposed between the bar and adjusting lever for locking the bar in adjusted position, said means comprising a holding bolt passing through the bar and the slot and serrations in the surface surrounding the slot and means associated with the holding bolt adapted to be thrown into engagement with said serrations when the bolt is tightened.

23. An automobile bumper support comprising a bar bent back upon itself in substantially a U shape, the shorter arm of the bar being adapted to engage one side of an automobile frame flange, a clamping lever pivoted on the other arm of the bar and adapted to be rotated into clamping engagement with the opposed side of the flange, an adjusting lever associated with the clamping lever having a slot therein concentric with the bar, a bumper support pivoted on the bar and means associated with the bumper support engaging said slot for drawing the parts together to lock the bumper support in adjusted position on the adjusting lever.

24. An automobile bumper support comprising a bar bent back upon itself in substantially a U shape, the shorter arm of the bar being adapted to engage one side of an automobile frame flange, a clamping lever pivoted on the other arm of the bar and adapted to be rotated into clamping engagement with the opposed side of the flange, an adjusting lever associated with the clamping lever having a slot therein concentric with the bar, a bumper support pivoted on the bar and means associated with the bumper support engaging said slot for drawing the parts together to lock the bumper support in adjusted position on the adjusting lever, said means comprising serrations in the surface of the adjusting lever adjacent the slot and means associated with the bumper support adapted to engage said serrations.

25. An automobile bumper support comprising a bar bent back upon itself in substantially a U shape, the shorter arm of the bar being adapted to engage one side of an automobile frame flange, a clamping lever pivoted on the other arm of the bar and adapted to be rotated into clamping engagement with the opposed side of the flange, an adjusting lever associated with the clamping lever having a slot therein concentric with the bar, a bumper support pivoted on the bar and means associated with the bumper support engaging said slot for drawing the parts together to lock the bumper support in adjusted position on the adjusting lever, said means comprising serrations in the surface of the adjusting lever adjacent the slot and means associated with the bumper support adapted to engage said serrations, comprising a lock washer, the holding bolt passing through the bumper support and the slot and adapted when tightened up to lock the parts together in adjusted position.

26. A clamp for automobile bumpers and the like comprising a clamping member adapted to engage one side of the frame, a lever, a connection between it and the clamping member, and means for rocking it to grip the flange between it and the clamping member, a bumper bar support pivoted on the clamping member and means associated with the lever for holding the bumper bar support against rotation about the clamping member, the means for holding the bumper bar support against rotation comprising a slotted arm projecting from the clamping member having a curved slot concentric with the pivot of the bumper bar support, corrugations on the face of such member adjacent said slot, means for holding the bumper bar support and the member together and means associated with the bumper bar support adapted to engage the corrugations and when drawn together to prevent rotation.

27. A clamp for automobile bumpers and the like comprising a clamping member adapted to engage one side of the frame, a cam, a connection between it and the clamping member, and means for rocking it to grip the frame between it and the clamping member, a bumper bar support pivoted on the clamping member and means associated with a cam for holding the bumper bar support against rotation about the clamping member, the means for holding the bumper bar support against rotation comprising a slotted arm projecting from the clamping member having a curved slot concentric with the pivot of the bumper bar support, corrugations on the face of such member adjacent said slot, means for holding the bumper bar support and the member together and means associated with the bumper bar support adapted to engage the corrugations and when drawn together to prevent rotation.

28. A clamp for automobile bumpers and the like comprising a clamping member adapted to engage one side of the frame, a lever, a connection between it and the clamping member, and means for rocking it to grip the flange between it and the clamping member, the rocking means comprising a set screw adapted to engage the frame, a bumper bar support pivoted on the clamping member and means associated with the lever for holding the bumper bar support against rotation about the clamping member, the means for holding the bumper bar support against rotation comprising a slotted arm projecting from the clamping member having a curved slot concentric with the pivot of the bumper bar support, corrugations on the face of such member adjacent said slot, means for holding the bumper bar support and the member together and means associated with the bumper bar support adapted to engage the corrugations and when drawn together to prevent rotation.

29. A clamp for automobile bumpers and the like comprising a clamping member adapted to engage one side of the frame, a cam, a connection between it and the clamping member, and means for rocking it to grip the frame between it and the clamping member, the rocking means comprising a set screw adapted to engage the frame, a bumper bar support pivoted on the clamping member and means associated with the cam for holding the bumper bar support against rotation about the clamping member, the means for holding the bumper bar support against rotation comprising a slotted arm projecting from the clamping member having a curved slot concentric with the pivot of the bumper bar support, corrugations on the face of such member adjacent said slot, means for holding the bumper bar support and the member together and means associated with the bumper bar support adapted to engage said corrugations and when drawn together to prevent rotation.

30. A clamp for automobile bumpers and the like comprising a clamping member adapted to engage one side of the frame, a lever, a connection between it and the clamping member, and means for rocking it to grip the flange between it and the clamping member, the lever being provided with an elongated sharpened frame engaging edge, adjacent its fulcrum, the lever rocking means being farther removed from the fulcrum than the frame engaging edge, a bumper bar support pivoted on the clamping member and means associated with the lever for holding the bumper bar support against rotation about the clamping member, the means for holding the bumper bar support against rotation comprising a slotted arm projecting from the clamping member having a curved slot concentric with the pivot of the bumper bar support, corrugations on the face of such member adjacent said slot, means for holding the bumper bar support and the member together and means associated with the bumper bar support adapted to engage said corrugations and when drawn together to prevent rotation.

31. A clamp for automobile bumpers and the like comprising a clamping member adapted to engage one side of the frame, a lever, a connection between it and the clamping member, and means for rocking it to grip the flange between it and the clamping member, the rocking means comprising a set screw adapted to engage the frame, the lever being provided with an elongated sharpened frame engaging edge, a bumper bar support pivoted on the clamping member and means associated with the lever for holding the bumper bar support against rotation about the clamping member, the means for holding the bumper bar support against rotation comprising a slotted arm projecting from the clamping member having a curved slot concentric with the pivot of the bumper bar support, corrugations on the face of such member adjacent said slot, means for holding the bumper bar support and the member together and means associated with the bumper bar support adapted to engage said corrugations and when drawn together to prevent rotation.

32. An automobile bumper support comprising a clamp, a bumper bar pivoted thereon, and means carried by the clamp independent of the pivot support for holding the bumper bar aainst rotation, the means for holding the bumper bar support against rotation comprising a curved slot concentric with the pivot of the bumper bar support, corrugations on the face of such member adjacent said slot, means for holding the bumper bar support and the member together and means associated with the bumper bar support adapted to engage said corrugations and when drawn together to prevent rotation.

33. An automobile bumper support comprising a clamp adapted to engage the lower flange of an automobile frame, a bumper bar pivoted thereon, and means carried by the clamp independent of the pivot support for holding the bumper bar against rotation, the means for holding the bumper bar support against rotation comprising a slotted arm projecting from the clamping member having a curved slot concentric with the pivot of the bumper bar support, corrugations on the face of such member adjacent said slot, means for holding the bumper bar support and the member together and means associated with the bumper bar support adapted to engage said corrugations and when drawn together to prevent rotation.

34. A clamp for automobile bumpers and the like comprising a clamping member adapted to engage one side of the frame, a lever, a connection between it and the clamping member, and means for rocking it to grip the flange between it and the clamping member, a bumper bar support pivoted on the clamping member and means associated with the lever for holding the bumper bar support against rotation about the clamping member, the means for preventing rotation of the bumper bar support comprising a corrugated member removed from the pivot of the support, a projecting part carried by the support and means for drawing the parts together to interlock the projecting member and the corrugations to prevent rotation.

35. A clamp for automobile bumpers and the like comprising a clamping member adapted to engage one side of the frame, a cam, a connection between it and the clamping member, and means for rocking it to grip the frame between it and the clamping member, a bumper bar support pivoted on the clamping member and means associated with the cam for holding the bumper bar support against rotation about the clamping member, the means for preventing rotation of the bumper bar support comprising a corrugated member removed from the pivot of the support, a projecting part carried by the support and means for drawing the parts together to interlock the projecting member and the corrugations to prevent rotation.

36. A clamp for automobile bumpers and the like comprising a clamping member adapted to engage one side of the frame, a lever, a connection between it and the clamping member, and means for rocking it to grip the flange between it and the clamping member, the rocking means comprising a set screw adapted to engage the frame, a bumper bar support pivoted on the clamping member and means associated with the lever for holding the bumper bar support against rotation about the clamping member, the means for preventing rotation of the bumper bar support comprising a corrugated member removed from the pivot of the support, a projecting part carried by the support and means for drawing the parts together to interlock the projecting member and the corrugations to prevent rotation.

37. A clamp for automobile bumpers and the like comprising a clamping member adapted to engage one side of the frame, a cam, a connection between it and the clamping member, and means for rocking it to grip the frame between it and the clamping member, the rocking means comprising a set screw adapted to engage the frame, a bumper bar support pivoted on the clamping member and means associated with the cam for holding the bumper bar support against rotation about the clamping member, the means for preventing rotation of the bumper bar support comprising a corrugated member removed from the pivot of the support, a projecting part carried by the support and means for drawing the parts together to interlock the projecting member and the corrugations to prevent rotation.

38. A clamp for automobile bumpers and the like comprising a clamping member adapted to engage one side of the frame, a lever, a connection between it and the clamping member, and means for rocking it to grip the flange between it and the clamping member, the lever being provided with an elongated sharpened frame engaging edge adjacent its fulcrum, the lever rocking means being farther removed from the fulcrum than the frame engaging edge, a bumper bar support pivoted on the clamping member and means associated with the lever for holding the bumper bar support against rotation about the clamping member, the means for preventing rotation of the bumper bar support comprising a corrugated member removed from the pivot of the support, a projecting part carried by the support and means for drawing the parts together to interlock the projecting member and the corrugations to prevent rotation.

39. A clamp for automobile bumpers and the like comprising a clamping member adapted to engage one side of the frame, a lever, a connection between it and the clamping member, and means for rocking it to grip the flange between it and the clamping member, the rocking means comprising a set screw adapted to engage the frame, the lever being provided with an elongated sharpened frame engaging edge adjacent its fulcrum, the lever rocking means being farther removed from the fulcrum than the frame engaging edge, a bumper bar support pivoted on the clamping member and means associated with the lever for holding the bumper bar support against rotation about the clamping member, the means for preventing rotation of the bumper bar support comprising a corrugated member removed from the pivot of the support, a projecting part carried by the support, and means for drawing the parts together to interlock the projecting member and the corrugations to prevent rotation.

40. An automobile bumper support comprising a clamp, a bumper bar pivoted thereon, and means carried by the clamp independent of the pivot support for holding the bumper bar against rotation, the means for preventing rotation of the bumper bar support comprising a corrugated member removed from the pivot of the support, a projecting part carried by the support, and means for drawing the parts together to interlock the projecting member and the corrugations to prevent rotation.

41. An automobile bumper support comprising a clamp adapted to engage the lower flange of an automobile frame, a bumper bar pivoted thereon, and means carried by the clamp independent of the pivot support for holding the bumper bar against rotation, the means for preventing rotation of the bumper bar support comprising a corrugated member removed from the pivot of the support, a projecting part carried by the support and means for drawing the parts together to interlock the projecting member and the corrugations to prevent rotation.

42. An automobile bumper bar support comprising a hook bolt engaging the flange of the automobile frame, a sleeve mounted for rotation on the hook bolt, a fulcrum member projecting from said sleeve above and below the lever arm projecting therefrom on the side opposite the fulcrum member, a set screw screw-threaded in said lever arm adapted to engage the frame to rotate the sleeve to clamp the parts upon the frame, the sleeve part being interchangeable between the opposed automobile frame members.

43. An automobile bumper bar support comprising a hook bolt engaging the flange of the automobile frame, a sleeve mounted for rotation on the hook bolt, a fulcrum member projecting from said sleeve above and below the lever arm projecting therefrom on the side opposite the fulcrum member, a set screw screw-threaded in said lever arm adapted to engage the frame to rotate the sleeve to clamp the parts upon the frame, the sleeve part being interchangeable between the opposed automobile frame members, a slotted arm projecting from the sleeve and frame, engaging arms projecting from the sleeve altogether independent of the clamping action and adapted to prevent twisting of the clamp on the frame.

44. An automobile bumper bar support comprising a hook bolt engaging the flange of the automobile frame, a sleeve mounted for rotation on the hook bolt, a fulcrum member projecting from said sleeve above and below the lever arm projecting therefrom on the side opposite the fulcrum member, a set screw screw-threaded in said lever arm adapted to engage the frame to rotate the sleeve to clamp the parts upon the frame, the sleeve part being interchangeable between the opposed automobile frame members, a bumper bar pivoted on the hook bolt, and means including a slot in the bar and the slot on the sleeve for holding the bumper bar against rotation on the clamp.

45. An automobile bumper bar support comprising a hook bolt engaging the flange of the automobile frame, a sleeve mounted for rotation on the hook bolt, a fulcrum member projecting from said sleeve above and below the lever arm projecting therefrom on the side opposite the fulcrum member, a set screw screw-threaded in said lever arm adapted to engage the frame to rotate the sleeve to clamp the parts upon the frame, the sleeve part being interchangeable between the opposed automobile frame members, a slotted arm projecting from the sleeve and frame, engaging arms projecting from the sleeve altogethr independent of the clamping action and adapted to prevent twisting of the clamp on the frame, a bumper bar pivoted on the hook bolt, and means including a slot in the bar and the slot on the sleeve for holding the bumper bar against rotation on the clamp.

In testimony whereof I affix my signature in the presence of two witnesses this thirteenth day of January, 1920.

LEWIS P. HALLADAY.

Witnesses:
  EDITH L. PORTER,
  MILDRED H. MACKL.